May 17, 1927.
F. H. GLEASON
1,629,453
AUTOMOBILE CHASSIS LUBRICATING DEVICE
Filed Sept. 6, 1921
2 Sheets-Sheet 1
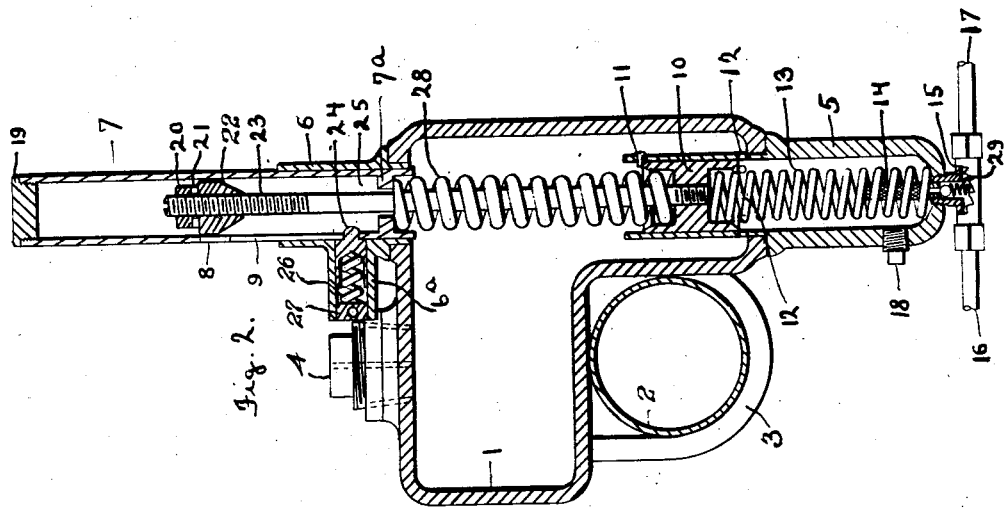
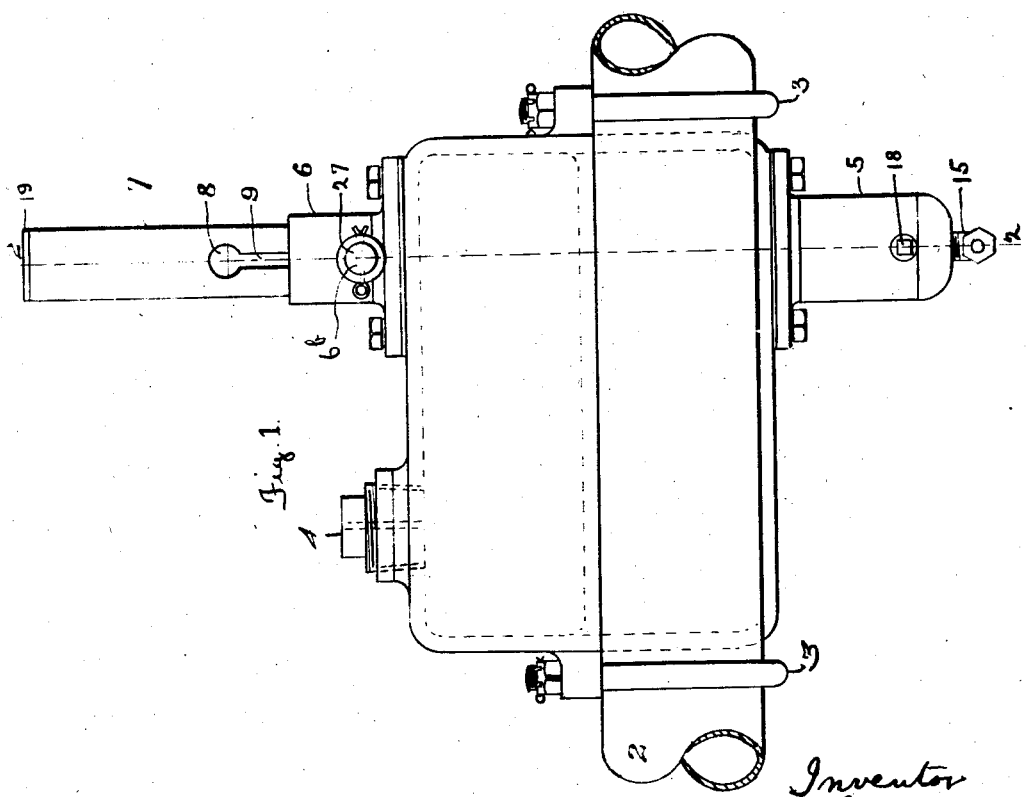
Inventor
F H Gleason
by T P Bourne
his atty

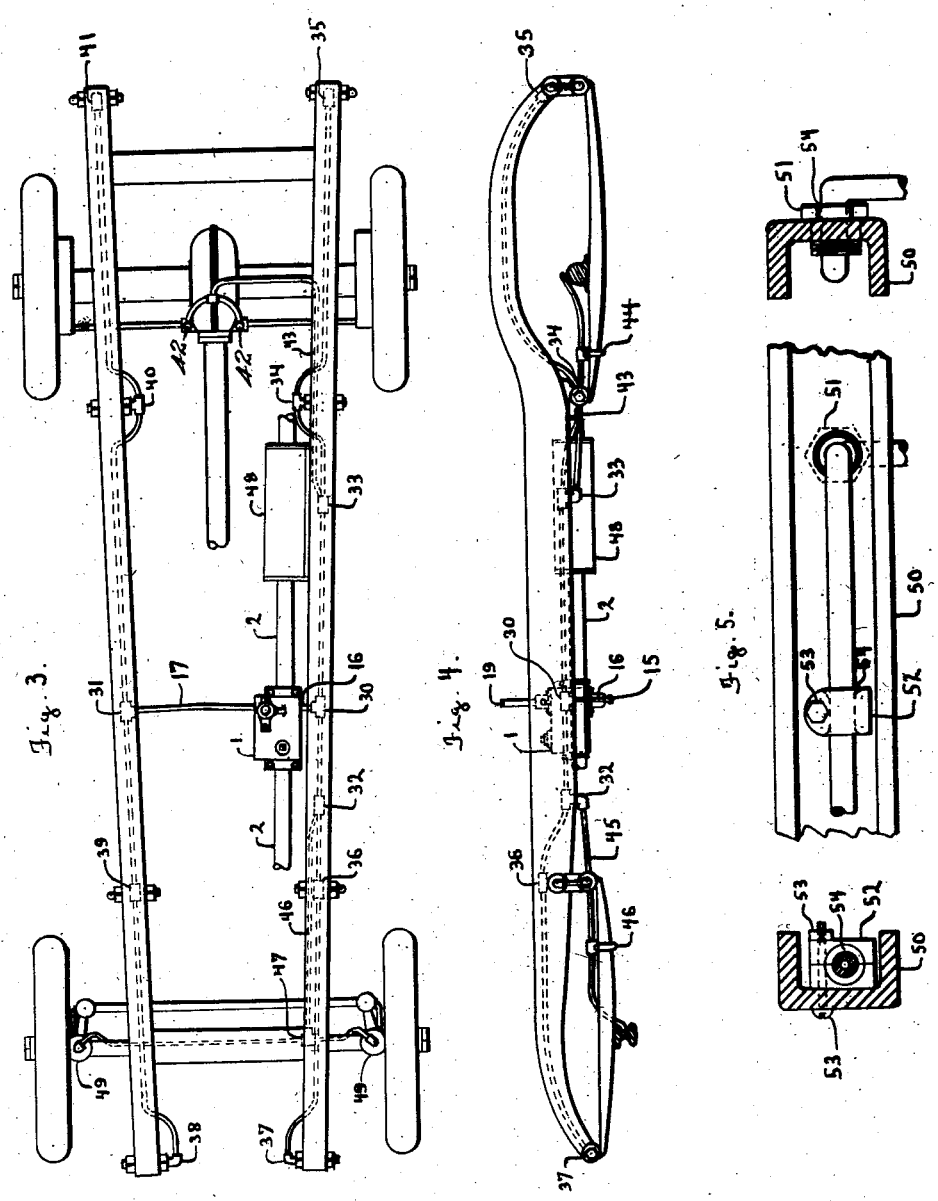

Patented May 17, 1927.

1,629,453

UNITED STATES PATENT OFFICE.

FREDERICK H. GLEASON, OF NEW YORK, N. Y.

AUTOMOBILE CHASSIS-LUBRICATING DEVICE.

Application filed September 6, 1921. Serial No. 498,740. REISSUED

Authorities on lubrication recommend for automobile chassis lubrication the use of a heavy fluid oil having a cold test of about 30° F., at which temperature it is a solid (not fluid), which oil has an A S T M (Saybolt) vicosity of 6656 seconds at 50° F. and 4650 seconds at 80° F. The flash test is 400° F. and the fire test 440° F. At temperature above the fire test this oil is subject to cracking.

At the temperatures encountered during the use of an automobile, said oil flows (or pours) so slowly that the oil pump of ordinary construction cannot handle it. The atmospheric pressure (approximately 14 pounds per square inch) acting on the surface of the oil during the short period of time allowed for filling the cylinder of the ordinary oil pump is not great enough to cause the oil to flow into the cylinder. In winter when temperatures of 30° F. and lower are of common occurrence said oil cannot be handled by the ordinary pump.

My improved lubricator reservoir, pump and tubing distribution system embodies novel features which enable an automobile chassis to be lubricated with the above mentioned oil under all temperature conditions with the shortest length of tubing, the smallest number of parts, and the minimum of complications.

Other objects will appear and be better understood from that embodiment of my invention of which the following is a specification, reference being had to the accompanying drawings forming part hereof, in which:

Figure 1 is a side elevational view of my improved lubricator reservoir and pump; Fig. 2 is a sectional view through the lubricator reservoir and pump taken on line 2, 2, in Fig. 1; Fig. 3 is a top view of an automobile chassis, showing the lubricator reservoir and pump in position on an engine exhaust pipe, and the tubing for the oil distribution system; Fig. 4 is a side view of Fig. 3; Fig. 5 is a partly sectional view of the chassis frame and the clips for attaching and passing the tubing through the frame.

Similar numerals refer to similar parts throughout the several views:

At 1 is indicated an L shaped oil reservoir, which may be of cast iron and shown attached to the exhaust pipe 2 of an automobile chassis by means of the U shaped clamps 3. A filler plug 4 with an air vent is provided in the top surface of reservoir 1.

A cylinder 5 provided with a drain plug 18 is attached to the lowest part of reservoir 1, and a cylindrical sleeve 7 slides in the guide 6 attached to the top surface of reservoir 1 directly over the cylinder 5. The top 19 of the cylindrical sleeve 7 may project through the floor boards of the automobile chassis in front of the front seat. A piston 10 operates in cylinder 5 and is normally held at the top of its stroke against the stop on 11 by a slight compression of the light spring 13. At the lower edge of piston 10 a number of ports or passages 12 through the wall of cylinder 5 provide passages for the oil from the lubricator reservoir 1 into the cylinder 5 when the piston 10 is in its normal position at the top of its stroke. A plunger 24 in a boss 6ᵃ of the guide 6 has a spring 26 held in place by collar 27 secured by a pin 6ᵇ in boss 6ᵃ. The cylindrical sleeve 7 has a longitudinal slot 9 with an enlargement 8 at the top end of the slot. The smaller diameter of the plunger 24 slides in slot 9 and the larger diameter of plunger 24 fits into enlargement 8 of cylindrical sleeve 7. The sleeve 7 is normally held at its top position with the smaller diameter of plunger 24 at the bottom of slot 9 by a slight compression of the heavy spring 28 and the light spring 13. Spring 28 bears against shoulder 7ᵃ of sleeve 7 and against piston 10. The piston 10 has a rod 23 extending up inside of sleeve 7 through shoulder 7ᵃ, said rod having a tapered nut 22, washer 21 and lock nut 20 near its threaded upper end. A screen 14 is attached to tubing check valve T 15 provided with check valve and spring 29. The oil is conducted away from T 15 by the tubes 16 and 17 shown attached to T 15 by standard tubing nuts and sleeves.

In Figs. 3 and 4 the lubricator reservoir and pump 1 is shown attached to the engine exhaust pipe 2 which leads to the muffler 48. Tubing lines 16 and 17 lead to fittings 30 and 31 respectively on each side of the chassis frame. A tubing line on one side of the chassis extends from the outer end front spring fitting 38 through rear end front spring fitting 39, through supply fitting 31 connected to tube 17, through front end rear spring fitting 40 to rear end rear spring fitting 41. On the other side of the chassis a tubing line extends from the outer end front spring fitting 37 through rear end front spring fitting 36 through front axle and tie rod supply fitting 32 through supply fitting 30 connected to tube 16, through rear axle supply fitting 33, through front end rear spring fitting 34 to rear end rear spring fitting 35. Flexible tubing line 46 leads from axle supply fitting 32 to fitting 47 on the front axle, which may be constructed by vulcanizing a rubber hose over an annealed copper tube and contracting a ferrule over the ends of the rubber tubing and soldering the ferrule to the tubing. Flexible tubing line 43 from the rear axle supply fitting 33 to the T connecting brake shaft bearings 42 and 42 is of the last named construction. The bore or internal cross sectional area of the tubing extending from fitting 32 through fitting 30 to fitting 33 and from fitting 30 through fitting 15 and ending at fitting 31 is twice the area of the tubing used for the other lines (tubing from fitting 38—39—31—40—41, from fitting 37—36—32, from fitting 32—47 to 49 and 49, from fitting 33, 34 to 35, and from 33 to 42 and 43). The oil delivery hole in fitting 39 has an area of one half of the area of the supply line, the oil delivery hole in fitting 38 has an area of two thirds of the area of the supply line, (the bore in fitting 38 is larger than the bore in fitting 39 to compensate for internal surface oil friction, capillary attraction and the drop in pressure due to the above factors and the increased distance from the pump). The foregoing dimensions are examples for use with my improved lubricator. When more than two delivery points are supplied by the same line the area of the various delivery holes are calculated to divide up the area of the supply line, allowance being made for extra area in the delivery holes farthest from the pump to compensate for unequal oil delivery. The flexible tubing line 45 is brought down from frame fitting 32 to fitting 47 on the axle along the line of the rear half of the front spring and is held in place by clips 46 attached to the bolts of the spring rebound clips. Clip 46 permits tubing to slide, (which construction provides for the minimum amount of bending or flexing of the tube with no abrupt bends). Tubing lines securely attached to the front axle web connect fitting 47 with the fittings 49 and 49 on the top of the knuckle king pin bolts, (which fittings 49 and 49 have delivery bores each with an area equal to one half of the area of the supply tube). Specific means for lubricating the steering knuckles and tie rod connections are not set forth herein as they are set forth in my application Serial No. 438,064.

The flexible tubing line 43 extends from rear axle supply fitting 33 along the front half of the rear spring held by clip 44 to a T with branches to brake shaft bearings 42 and 42, (the oil delivery holes in these fittings 42 and 42 having one half of the area of the supply tube).

In Fig. 5 is shown a clip 52 for attaching the tubing to the frame 50, which clip may be made from soft-greasy die cast metal in two like or similar halves with a hole with fillet 54 at each end for the tubing. Said clip is placed around the tubing and is fastened together and to the frame by the screw and nut 53. In Fig. 5 is shown a bushing 51 for carrying the tubing through the frame 50, which bushing may be made from soft-greasy-diecast metal with a hexagon head and outside threaded part to screw into threaded hole in frame 50, said bushing having a hole through its center with fillets 54 at each end of the hole to carry the tubing. This method of securing the tubing permits of securely holding the tubing and at the same time allows it to slide in the supporting clips, eliminating stresses which in time might break the tubing.

Specific means for lubricating the spring bolts and shackles are disclosed in my pending application No. 438,065, filed January 18th, 1921.

Specific means for lubricating the drag steering link are disclosed in companion application filed herewith.

The following data will aid in understanding the action of the complete system: Tubing lines with smallest internal diameter are preferably of annealed copper tubing $\frac{3}{16}''$ outside diameter with a wall .06'' thick having a bore with an area of .003509 square inches; largest tubing lines are preferably of $\frac{3}{16}''$ outside diameter with a wall .05'' thick having a bore with an area of .006012 square inches. The average installation has about 530'' of tubing with a capacity of approximately 1.859 cubic inches of oil. The pump with piston 1⅛'' diameter and a stroke of 2'' will deliver approximately 1.988 cubic inches of oil with full stroke. With the foregoing examples the spring 28 will preferably be such that when compressed by sleeve 7 it will exert about 125 pounds pressure per square inch on the oil contained in the pump and the tubing distribution system. A system having 530'' of tubing with a capacity of 1.859 cubic inches of oil and having 30 oil delivery points will deliver approximately .062 cubic inches of oil at each point. No one single point can be over-lubricated because the entire system holds only a comparatively small amount of oil. A certain amount of oil always remains in the tubing distribution system due to surface friction, low points in the system and to vacuums. The amount of oil delivered by the pump can be regulated by adjusting the tapered nut 22 which in turn regulates the amount of oil delivered at the delivery terminals.

The general operation of the system is as follows:—The oil contained in the reservoir 1 attached to the exhaust pipe 2 is maintained at a suitable temperature, say of from 100° F. to 200° F. when the motor is running, regardless of the seasonal temperature. The piston 10 is always automatically returned to its top position against the stop pin 11 by spring 13 and normally is in that position, the ports or passages 12 then being open connecting the reservoir 1 with the cylinder 5, giving the oil ample time to completely fill the cylinder 5. The chassis is lubricated by depressing sleeve 7, as by stepping on the top 19 of said sleeve which projects through the car floor board, until plunger 24 enters enlargement or hole 8 of sleeve 7. Spring 28 is then compressed, since the piston meets the resistance of oil in cylinder 5 and the piston is gradually forced down in cylinder 5 by the pressure of spring 28. The oil is forced out of cylinder 5 by piston 10 through the screen 14 and check valve 29 into the chassis tubing distribution system. When the piston 10 is near the bottom of its stroke the tapered nut 22 operated by rod 23 attached to piston 10 presses the plunger 24 back, releasing sleeve 7 and releasing the pressure of spring 28 on piston 10. The spring 13, which has been compressed by the stronger spring 28 during the down stroke of the piston 10, now returns piston 10 to its top position against stop pin 11. The oil in space 25 between shoulder 7ª at the bottom of sleeve 7 and the tapered adjusting nut 22 on piston rod 23, then within the main oil chamber, acts as a dash pot, preventing the sleeve 7 from returning suddenly to its top position when the pressure on spring 28 is relieved by the release of plunger 24. The cylinder 5 now has the long interval of time between the lubrications of the chassis to completely fill with oil from the reservoir 1 through the ports or passages 12. The cubic capacity of the pump and the cubic capacity of the tubing distribution system being about equal and the area of the tubing bores graduated from the pump to the terminals coupled with the graduated areas of the delivery holes produce about the same pressure at each delivery point and approximately the same amount of oil is delivered at each point, with the exception that if any line has more than two deliveries, that line will have its cubic capacity divided between its delivery points. When the system is operated in temperatures of 30° F. and lower, the oil in the reservoir and pump is maintained by the heat from the exhaust pipe in a fluid state but the oil in the tubing distribution system is congealed into a jelly-like mass. When sleeve 7 is depressed the spring 28 maintains a pressure of about 125 pounds per square inch on the tubing distribution system until a volume of the jelly-like oil in the tubes equal to the volume of oil in the pump cylinder is displaced through the delivery terminals when the piston automatically returns to its top normal position and the pump cylinder fills with oil ready for another chassis lubrication.

An advantage of my improvement is that the operator merely has to depress sleeve 7 until it is locked by plunger 24, the action of forcing the lubricant to the bearings continuing automatically by means of spring 28 until plunger 24 is automatically operated to release sleeve 7, spring 28 and plunger 24, to enable cylinder 5 to be again charged with lubricant. A definite amount of oil is fed each time sleeve 7 is depressed.

If the chassis is always lubricated when the car is being operated over the road, the motions of the car produced by the inequalities of the road remove the load from the various bearings and allow the lubricant to flow in between every part of the loaded surfaces.

The entire system can be quickly and thoroughly cleaned by removing drain plug 18 in the lower part of the cylinder 5 and allowing the oil in the reservoir 1 and pump 5 to drain out, the drain plug 18 is then replaced, the reservoir 1 filled with kerosene oil and the sleeve 7 depressed until all of the kerosene is forced through the system, when the lubricator reservoir 1 is again filled with oil.

While I have described my improved lubricator as particularly adapted for forcing lubricant to the bearings of an automobile chassis, it will be understood that my lubricator may be used for other purposes where a constant fluid feed, as desired, is required.

Having now described my invention, I claim as new and desire to secure by Letters Patent:

1. A lubricator comprising a reservoir having an outlet for lubricant, spring controlled means to gradually force lubricant from the reservoir, means to set said means under pressure against the lubricant, and means to automatically release said pressure upon discharge of a predetermined amount of lubricant.

2. A lubricator comprising a reservoir having a communicating cylinder provided with an outlet, a spring-pressed piston operative in said cylinder, means to set the spring under pressure against the piston, and means to release said pressure when the piston has discharged a predetermined amount of lubricant.

3. A lubricator comprising a reservoir having a communicating cylinder provided with an outlet, a spring-pressed piston operative in said cylinder, means to set the spring under pressure against the piston, means to release said pressure when the piston has discharged a predetermined amount of lubricant, and a spring to restore the piston to initial position.

4. A lubricator comprising a reservoir having a communicating cylinder provided with an outlet, a piston operative in said cylinder, a spring to force the piston against lubricant in said cylinder, means to set and retain the spring under tension, and means to release the tension of said spring.

5. A lubricator comprising a reservoir having a communicating cylinder provided with an outlet, a piston operative in said cylinder, a spring to force the piston against lubricant in said cylinder, means to set and retain the spring under tension, means to release the tension of said spring, and a spring operative against said piston to return it and the first named spring to initial position.

6. A lubricator comprising a reservoir having a communicating cylinder provided with an outlet, a piston operative in said cylinder, a spring to force the piston against lubricant in said cylinder, means to set and retain the spring under tension, means controlled by the piston to release said retaining means, and means to return the piston and spring to initial position.

7. A lubricator comprising a reservoir having a communicating cylinder provided with an outlet, a piston operative in said cylinder, a spring to force the piston against lubricant in said cylinder, a reciprocative sleeve cooperative with said spring, retaining means for said sleeve, and means operative by said piston to actuate the retaining means to release the sleeve.

8. A lubricator comprising a reservoir having a communicating cylinder provided with an outlet, a piston operative in said cylinder, a spring to force the piston against lubricant in said cylinder, a reciprocative sleeve cooperative with said spring, retaining means for said sleeve, means operative by said piston to actuate the retaining means to release the sleeve, and a spring to return the piston, first named spring and sleeve to initial position after the retaining means releases the sleeve.

9. A lubricator comprising a reservoir having a communicating cylinder provided with an outlet, a piston operative in said cylinder, a spring to force the piston against lubricant in said cylinder, a reciprocative sleeve to enter the reservoir, a plunger cooperative with the sleeve to retain it in set position, and a member operative by the piston to release said plunger.

10. A lubricator comprising a reservoir having a communicating cylinder provided with an outlet, a piston operative in said cylinder, a spring to force the piston against lubricant in said cylinder, a reciprocative sleeve to enter the reservoir, a plunger cooperative with the sleeve to retain it in set position, a member operative by the piston to release said plunger, and a spring operative with the piston to return the piston, the first named spring and the sleeve to initial position when the plunger releases the sleeve.

11. A lubricator comprising a reservoir having a communicating cylinder provided with an outlet, a piston operative in the cylinder, a spring in the cylinder to push the piston, an opposing spring of greater tension on the other side of the piston, a sleeve having a shoulder engaging the last-named spring, the piston having a taper member, the sleeve having a slot provided with an enlargement and a spring-pressed plunger operative in said slot and enlargement to be engaged by said member.

12. A lubricating apparatus comprising a reservoir having an outlet for lubricant, a movable piston for placing lubricant under pressure, separate springs disposed upon opposite sides of the piston and exerting unequal pressure thereon, means for placing the stronger of said springs under tension to move the piston against the increasing tension of the weaker spring, and means for releasing the tension on the stronger spring when the piston reaches a pre-determined position on its pressure-producing stroke.

13. A lubricating apparatus comprising a reservoir having an outlet for lubricant, a movable piston for placing the lubricant under pressure, an operating member for said piston, a spring interposed between the piston and the operating member, means for limiting the movement of the operating member in a pressure-producing direction, and for holding said member at said limit of movement, and means moving with the piston for releasing said holding means when a pre-determined position of the piston is reached.

14. A lubrication system for chassis bearings comprising such bearings, a reservoir for lubricant, a piping system connecting the reservoir to such bearings, a cylinder adapted to receive lubricant from the reservoir, a piston movable in the cylinder, a spring constituting the sole means for actuating the piston to expel lubricant from the cylinder through said piping system to the bearings, and a member for compressing the spring whereby the latter will actuate the piston to expel lubricant.

15. A lubrication system for chassis bearings comprising such bearings, a reservoir for lubricant, a piping system connecting the reservoir to such bearings, a cylinder, a piston movable in the cylinder, a spring constituting the sole means for actuating the piston to expel lubricant from the cylinder through said piping system to the bearings, and said cylinder formed with an opening permitting lubricant to flow from the reservoir to the cylinder when the piston is moved rearwardly in the cylinder, and a member for compressing the spring whereby the latter will actuate the piston to expel lubricant.

16. A lubrication system for the chassis bearings of an automobile comprising such bearings, a reservoir for lubricant, a piping system connecting the reservoir to such bearings, a cylinder, a piston movable in the cylinder, a spring constituting the sole means for actuating the piston to expel lubricant from the cylinder through said piping system to the bearings, and a manually operable stem adapted for actuation externally of the apparatus for compressing the spring against one side of the piston whereby the spring may thereafter actuate the piston to expel the lubricant from the cylinder.

Signed at New York city, in the county of New York, and State of New York, this 1st day of September, A. D. 1921.

FREDERICK H. GLEASON.